M. CORY.
Corn-Planter.
No. 8,463.  Patented Oct. 28, 1851.
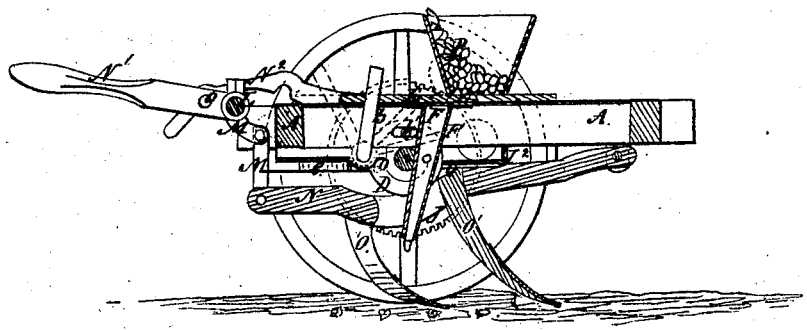
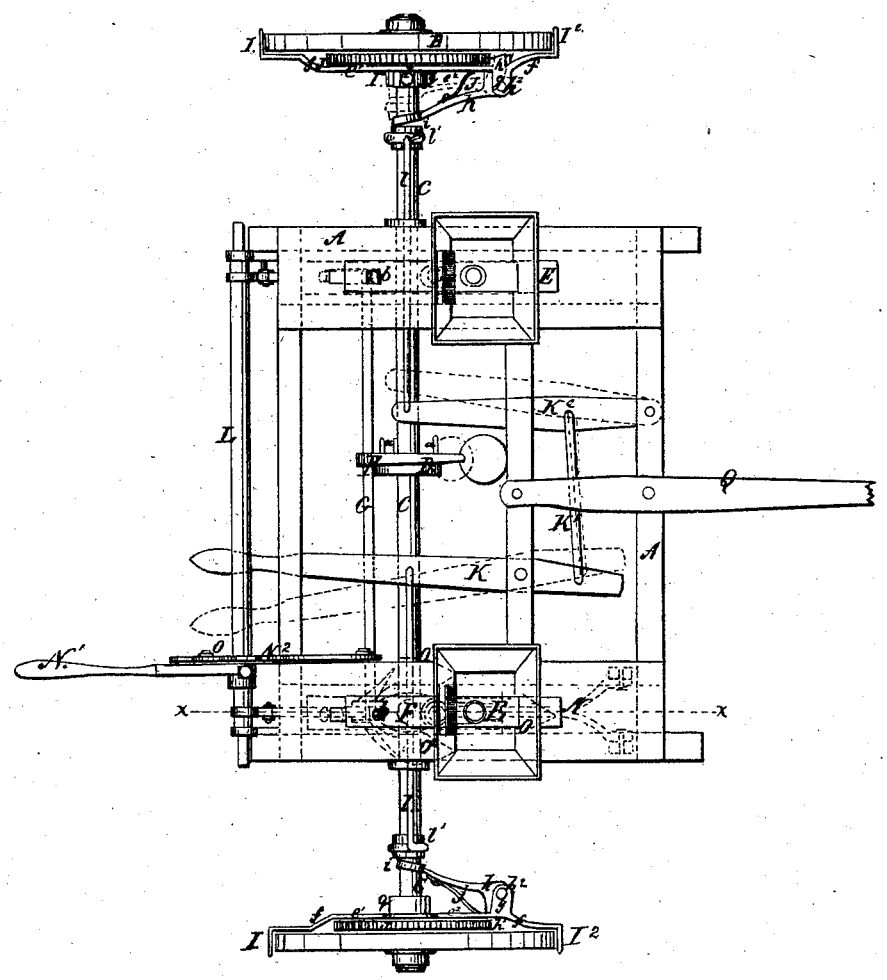

UNITED STATES PATENT OFFICE.

MYRON CORY, OF JERSEYVILLE, ILLINOIS.

IMPROVEMENT IN SEED-PLANTERS.

Specification forming part of Letters Patent No. 8,463, dated October 28, 1851.

*To all whom it may concern:*

Be it known that I, MYRON CORY, of Jerseyville, in the county of Jersey and State of Illinois, have invented certain new and useful Improvements in the Machine for Planting Corn and other Grain; and I do hereby declare that the following is a full, clear, and exact description of the construction and operation of the same, reference being had to the accompanying drawings, forming part of this specification, in which—

Figure 1 is a top or bird's-eye view of the machine. Fig. 2 is a vertical longitudinal section of the machine, taken in the line $xx$ in Fig. 1.

Similar letters of reference indicate corresponding parts in each of the two figures.

The nature of my invention consists in a novel device for indicating the place where the corn or grain has been planted when the operator is returning, either in hills or rows, as may be desired. This indicator has a small barrel at its middle, which fits over the main shaft, from which project two or more arms, as desired, the ends of which are bent over parallel with the periphery of the wheel in such a manner that when the machine is in operation the said bent portions will, by the weight of the machine upon them, leave a print or impression on the ground in a line at right angles with the direction of the travel of the machine, so as to enable the operator to see where to drop the grain or seed, as the case may be, and also enables him to drop the grain or corn at regular distances apart. This indicator is secured on the main axle of the machine by means of a set-screw passing through the said barrel, by means of which set-screw it may be adjusted at pleasure. There is also an arrangement for connecting and disconnecting the end of the arm to and from the cog-wheel for the purpose of adjusting the indicator to any desired position to correspond with the rows already dropped, such as spring-levers, rods, &c., being employed, which will be hereinafter described.

My invention consists, second, in the adaptation of the machine to plowing, planting, and covering, all at one and the same operation, by so arranging the plowshares on the hanging arm to which they are attached as to have one plowshare in front in the line of the seed-tube, which is designed to perform the operation of forming the furrow and pulverizing the soil, and two other plows behind and out of line with the first-mentioned one, the last-named plows being designed for turning in the soil, or to cover up the corn or grain as it falls from the tube into the furrow made by the first plow. This arrangement, it will be observed, dispenses with a large amount of labor that has to be expended in the ordinary modes of plowing and covering.

To enable others skilled in the art to make and use my invention, I will proceed to describe its construction and operation.

A A represent the frame of the machine, which may be constructed of any suitable material and of any desirable width and shape.

B B are the propelling-wheels.

C is the main axle or shaft, on which the wheels B B are secured and turn. This axle extends entirely across the machine, being hung in bearings on the frame, and also extends one-half the distance that the corn is designed to be planted apart on both sides of the machine, for the purpose of causing the machine to return in its own track, and also serving the double purpose of keeping the rows straight and at equal distances apart.

D is a wiper-wheel on the shaft or axle C. There may be any desirable number of pins, $a\ a$, projecting from its face, according to the kind of sowing required. This wiper-wheel is designed for operating the seed-slides E E in the following manner: As the machine is moved along the main axle C is caused to revolve, whereby the wiper-wheel is moved round likewise, which will (by one of the pins $a\ a$ on the face of the wiper-wheel coming in contact with the weighted lever F, which is permanently attached to the rod G) have the effect of elevating the said weighted lever to the position shown in red in the drawings, and will thereby have the further effect of throwing back the bent arms $b\ b$ of the rod, that slide in the slots in the top of the frame, back and forth alternately to the position shown by red lines in the drawings. Thus it will be seen the slides E E are operated upon by the said arms $b\ b$ of the rod G and caused to be moved out of the position shown by black lines in the drawings and assume the positions indicated by red lines, which positions, as seen in red, are the positions the slides occupy as they are about to deposit a grain of corn through the oval-shaped openings into the tube F' to be conveyed in the ground. The position these bent arms of the rod G occupy when thrown back by the lever F is very clearly indicated by red lines in Fig. 2, also the weighted lever and slides.

I is an indicator for indicating where the grain has been planted, so as to enable the operator to plant the rows in straight lines. This indicator is clearly represented in Fig. 1. It is a plate of metal having in its center a circular opening. Standing out from the face of said plate there is a small barrel, $q$, which serves as a bearing-box for the same. This projecting part slides on the main axle, as shown in the drawings. The two arms $e'$ $e^2$, that stand out from this bearing or barrel, have their ends $I'$ $I^2$ bent parallel with the periphery of the wheel, and also bent to the shape shown at $f$ $f$, so as to occupy the position represented without interfering with any of the working parts of the machine.

Near one end of the indicator it has ears $g$, to which is secured an arm, $h$, which works freely on a pin, $h^2$, passing through the ears, and also through one end, $h'$, of the arm $h$, which end $h'$ is of the form of a cog, or answers the same purpose. This cog $h'$ matches into one of the spaces of a cog-wheel, J, which is firmly secured to the wheel B. The other end, $i$, is of a circular or ring form, and slides on the main axle, as shown in Fig. 1. There is a small steel spring, $j$, attached to the arm $h$, for assisting in throwing the cog into or out of connection with the cog-wheel when desired. When it is necessary to disengage the cog $h'$ from the cog-wheel J it is only necessary to move the lever K to the position shown in red in the drawings, Fig. 1, which, with its connecting-rod $K'$, will operate the other lever, K, whereby power is applied to the rod $l$, which has a barrel, $l'$, on its end. The force of the levers applied to the rod $l$ causes it to press with great force against the end $i$ of the arm $h$, which presses against the spring $j$ and causes it to assume the position shown in Fig. 1 in red lines, where it will be seen that the cog $h$ is out of gear with the wheel J. By this means any alteration in the position of the indicator may be made at any point in the rows where they are found not to correspond with the rows already dropped.

L is the hind axle, to which the rods M $M'$, which connect the hanging arm N of the plowshares O $O'$ $O^2$, are attached or hung, as shown in Fig. 2.

$N'$ is the handle for elevating or lowering the plowshare hanging arm, and $N^2$ is a bent lever for catching on the pins $o$ in the handle, and thereby retaining the plowshares in the positions desired.

O $O'$ $O^2$ are the drill-teeth or plowshares, arranged as shown in the drawings, Fig. 1, where they are represented in blue dotted lines—one in the center and in a line with the seed-tube and the other two in different lines on the sides of the seed-tube—for the purpose of plowing, planting, and covering all at one and the same operation.

P are brushes set in the hopper, for brushing the grain and preventing it clogging.

Q is the reach or pole, to which the beasts of draft are attached.

The operation of the machine having been fully described in setting forth the nature and construction of the machine, it is unnecessary to repeat it again here.

Having thus described the nature and operation of my invention, I will now state what I claim as new and desire to secure by Letters Patent—

The employment of the indicator I, having its ends bent as described or in any other manner substantially the same, and secured on the main shaft in such a manner that it can be disengaged or thrown into connection with the wheel as desired, for the purpose of indicating the place where the corn has been planted, in the manner and for the purposes substantially as set forth.

MYRON CORY.

Witnesses:
 JONA. PLOWMAN,
 JNO. CORBETT.